United States Patent
Harada et al.

(10) Patent No.: US 10,074,398 B2
(45) Date of Patent: Sep. 11, 2018

(54) STORAGE DEVICE, CONTROLLER CIRCUIT, AND WRITING AND READING METHOD

(71) Applicant: Kabushiki Kaisha Toshiba, Minato-ku (JP)

(72) Inventors: Kohsuke Harada, Yokohama (JP); Akihiro Yamazaki, Yokohama (JP); Nobuhiro Maeto, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/702,033

(22) Filed: Sep. 12, 2017

(65) Prior Publication Data

US 2018/0197573 A1 Jul. 12, 2018

(30) Foreign Application Priority Data

Jan. 12, 2017 (JP) ................................ 2017-003169

(51) Int. Cl.
  *G11B 5/09* (2006.01)
  *G11B 20/10* (2006.01)
  *G11B 5/012* (2006.01)

(52) U.S. Cl.
  CPC ........ G11B 20/10037 (2013.01); G11B 5/012 (2013.01); *G11B 2220/2516* (2013.01)

(58) Field of Classification Search
  None
  See application file for complete search history.

(56) References Cited

U.S. PATENT DOCUMENTS

| 5,537,382 A * | 7/1996 | McLaughlin .... G11B 20/10009 341/59 |
| 8,988,814 B1 | 3/2015 | Harada et al. |
| 2002/0054557 A1 | 5/2002 | Mouri et al. |
| 2010/0080095 A1* | 4/2010 | Kobayashi ........... G11B 7/0062 369/47.15 |

(Continued)

FOREIGN PATENT DOCUMENTS

| JP | 2-31520 A | 2/1990 |
| JP | 5-37494 A | 2/1993 |
| JP | 2002-208229 A | 7/2002 |

OTHER PUBLICATIONS

S Yoshino, et al., "Performance Comparisons of Multi-level Codes for High Density MO Recording", IEEE International Conference on Communications, Jun. 1996, vol. 3, pp. 1538-1541.

*Primary Examiner* — Peter Vincent Agustin
(74) *Attorney, Agent, or Firm* — Oblon, McClelland, Maier & Neustadt, L.L.P.

(57) ABSTRACT

According to one embodiment, there is provided a storage device including a controller circuit and a storage medium. The controller circuit includes a first conversion circuit and a second conversion circuit. The first conversion circuit converts data into M-ary symbols where M is an integer of 3 or more. The second conversion circuit converts respective ones of the converted n samples of M-ary symbols into signals with L-patterned pulse width where n is an integer of 2 or more. The storage medium stores the converted n samples of signals with L-patterned pulse width. The controller circuit further includes an equalization circuit that equalizes signals read from the storage medium into the n samples of M-ary symbols.

15 Claims, 12 Drawing Sheets

(56) References Cited

U.S. PATENT DOCUMENTS

| | | | | |
|---|---|---|---|---|
| 2010/0232270 A1* | 9/2010 | Nakamura | ......... | G11B 7/00736 |
| | | | | 369/47.15 |
| 2010/0309773 A1* | 12/2010 | Kobayashi | ........... | G11B 7/0062 |
| | | | | 369/275.2 |
| 2011/0051592 A1* | 3/2011 | Nakamura | ......... | G11B 7/00456 |
| | | | | 369/283 |
| 2012/0057448 A1* | 3/2012 | Ito | ...................... | G11B 7/00456 |
| | | | | 369/112.23 |
| 2012/0307618 A1* | 12/2012 | Nogawa | ........... | G11B 20/10222 |
| | | | | 369/59.23 |

* cited by examiner

FIG.3A

| 3-BIT LABEL (USER DATA) | TWO SYMBOLS OF TERNARY (BASEBAND SIGNAL) |
|---|---|
| 000 | +1 +1 |
| 001 | +1 0 |
| 010 | +1 -1 |
| 011 | 0 +1 |
| 100 | 0 -1 |
| 101 | -1 +1 |
| 110 | -1 0 |
| 111 | -1 -1 |

FIG.3B

| ONE SYMBOL OF TERNARY (BASEBAND SIGNAL) | FOUR-TIMES-UP BIT SEQUENCE (FIRST BIT SEQUENCE) |
|---|---|
| -1 | 0000 |
| 0 | 0011 |
| 1 | 1111 |

FIG.3C

| THREE SYMBOLS OF TERNARY (BASEBAND SIGNAL) | FOUR-TIMES-UP BIT SEQUENCE (FIRST BIT SEQUENCE) | ADAPTED BIT SEQUENCE (SECOND BIT SEQUENCE) |
|---|---|---|
| (1, 0, -1) | (1111, 0011, 0000) | (1111, 1100, 0000) |
| (1, 0, 1) | (1111, 0011, 1111) | (1111, 1001, 1111) |
| (1, 0, 0) | (1111, 0011, 0011) | (1111, 1100, 0011) |
| (0, 0, -1) | (0011, 0011, 0000) | (0011, 1100, 0000) |
| (0, 0, 1) | (0011, 0011, 1111) | (0011, 1001, 1111) |
| (0, 0, 0) | (0011, 0011, 0011) | (0011, 1100, 0011) |
| (-1, 0, -1) | (0000, 0011, 0000) | (0000, 0110, 0000) |
| (0, 0, -1) | (1100, 0011, 0000) | (1100, 0110, 0000) |

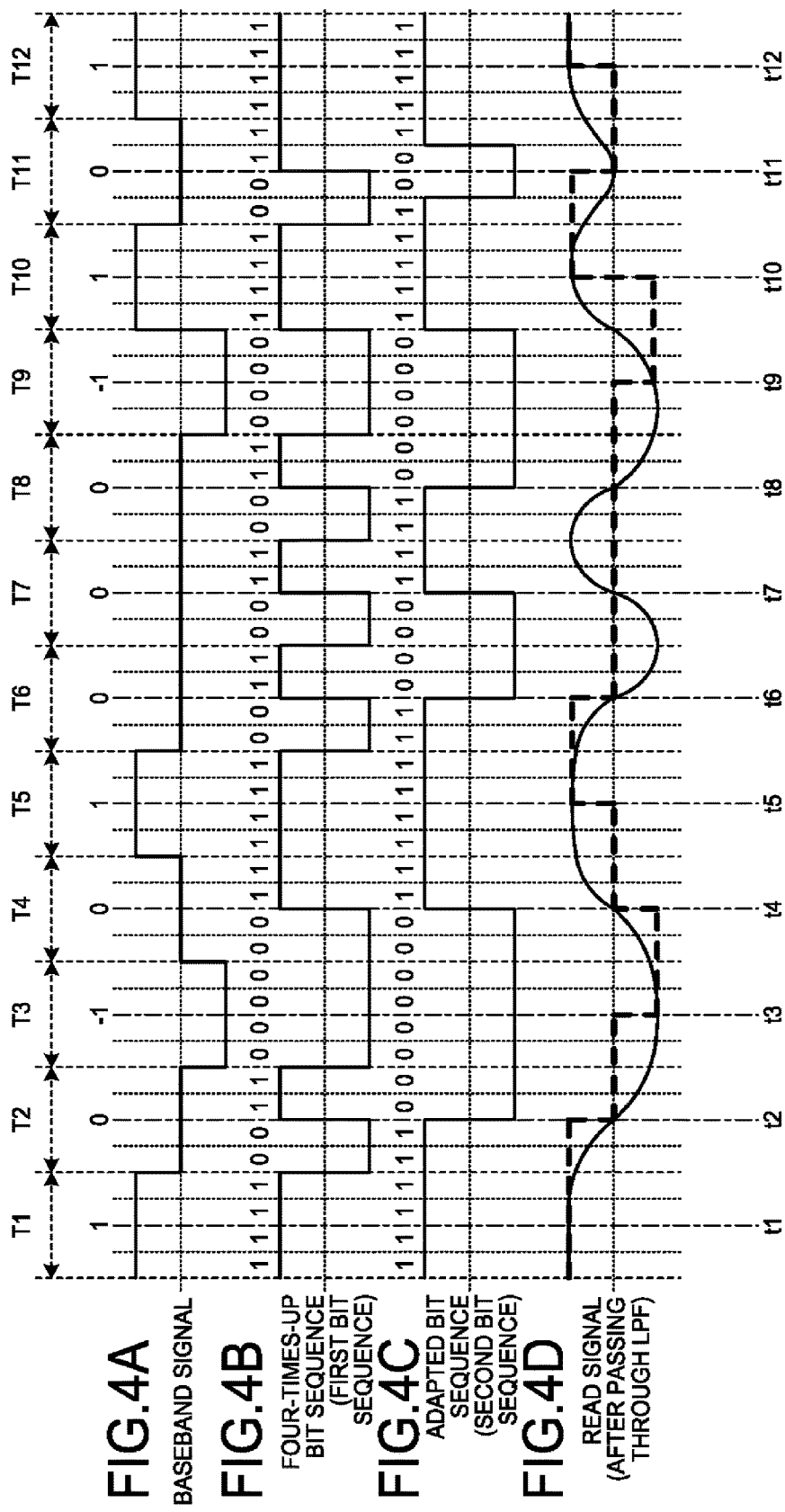

FIG.6A

| 3-BIT LABEL (USER DATA) | TWO SYMBOLS OF 4-VALUE (BASEBAND SIGNAL) |
|---|---|
| 000 | (-3, -3) |
| 001 | (-3, +1) |
| 010 | (-3, +3) |
| 011 | (-1, -1) |
| 100 | (+1, +1) |
| 101 | (+1, -3) |
| 110 | (+3, -3) |
| 111 | (+3, +3) |

FIG.6B

| ONE SYMBOL OF TERNARY (BASEBAND SIGNAL) | SIX-TIMES-UP BIT SEQUENCE |
|---|---|
| -3 | 000000 |
| -1 | 000011 |
| 1 | 001111 |
| 3 | 111111 |

FIG.6C

| SIX-TIMES-UP BIT SEQUENCE (FIRST BIT SEQUENCE) | ADAPTED BIT SEQUENCE (SECOND BIT SEQUENCE) |
|---|---|
| (111111, 001111, 000000) | (111111, 111100, 000000) |
| (111111, 000011, 000000) | (111111, 110000, 000000) |
| (111111, 001111, 111111) | (111111, 110011, 111111) |
| (111111, 000011, 111111) | (111111, 100001, 111111) |
| (111111, 001111, 001111) | (111111, 111100, 001111) |
| (111111, 000011, 001111) | (111111, 110000, 001111) |
| (111111, 001111, 000011) | (111111, 111100, 000011) |
| (111111, 000011, 000011) | (111111, 110000, 000011) |
| (001111, 001111, 000000) | (001111, 111100, 000000) |
| (001111, 000011, 000000) | (001111, 110000, 000000) |
| (001111, 001111, 111111) | (001111, 110011, 111111) |
| (001111, 000011, 111111) | (001111, 100001, 111111) |
| (001111, 001111, 001111) | (001111, 111100, 001111) |
| (001111, 000011, 001111) | (001111, 110000, 001111) |
| (001111, 001111, 000011) | (001111, 111100, 000011) |
| (001111, 000011, 000011) | (001111, 110000, 000011) |
| (000011, 001111, 000000) | (000011, 111100, 000000) |
| (000011, 000011, 000000) | (000011, 110000, 000000) |
| (000011, 001111, 111111) | (000011, 110011, 111111) |
| (000011, 000011, 111111) | (000011, 100001, 111111) |
| (000011, 001111, 001111) | (000011, 111100, 001111) |
| (000011, 000011, 001111) | (000011, 110000, 001111) |
| (000011, 001111, 000011) | (000011, 111100, 000011) |
| (000011, 000011, 000011) | (000011, 110000, 000011) |
| (000000, 001111, 000000) | (000000, 011110, 000000) |
| (000000, 000011, 000000) | (000000, 001100, 000000) |
| (000000, 001111, 111111) | (000000, 001111, 111111) |
| (000000, 000011, 111111) | (000000 000011, 111111) |
| (110000, 001111, 000000) | (110000, 011110, 000000) |
| (110000, 000011, 000000) | (110000, 001100, 000000) |
| (111100, 001111, 000000) | (111100, 011110, 000000) |
| (111100, 000011, 000000) | (111100, 001100, 000000) |

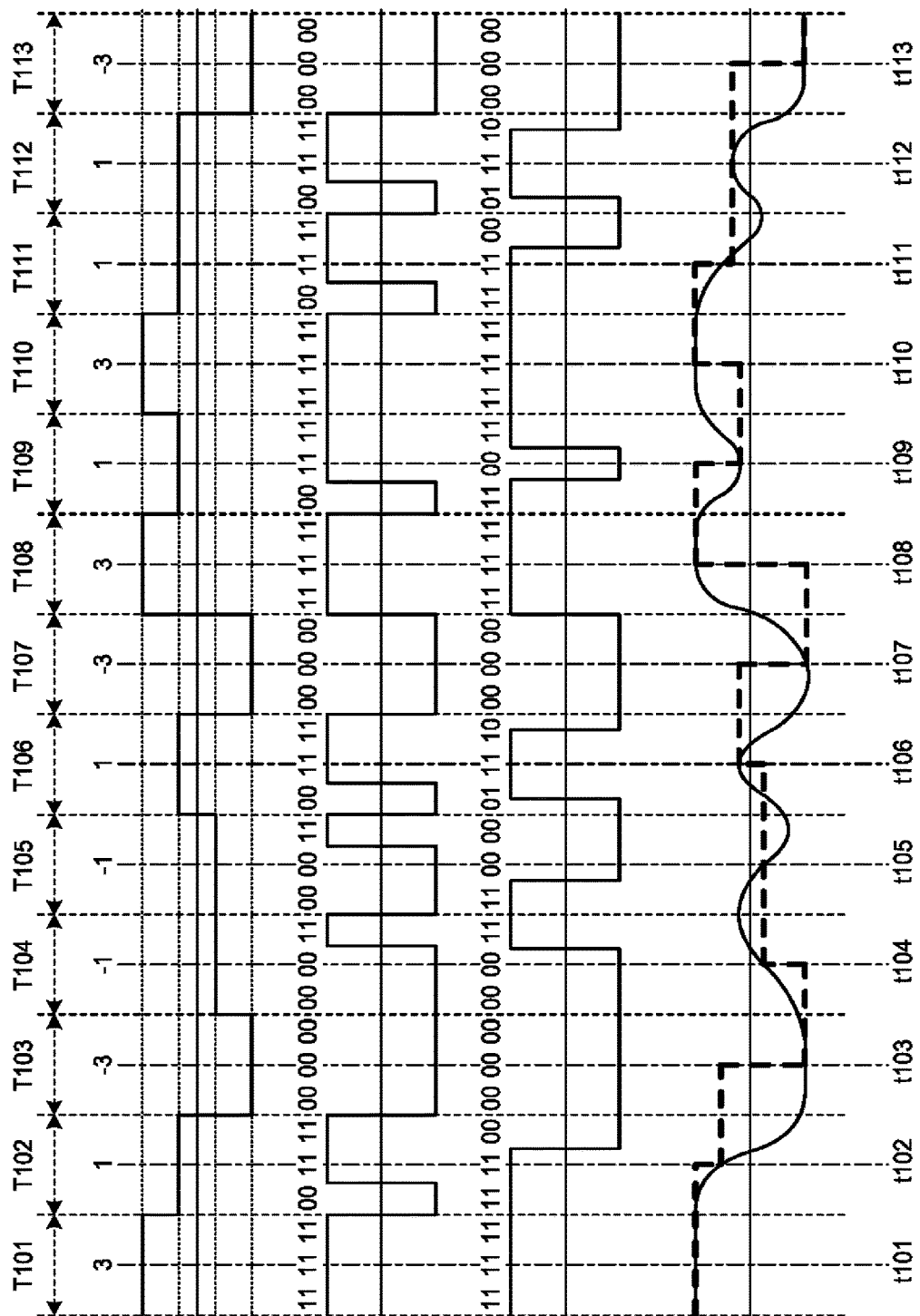

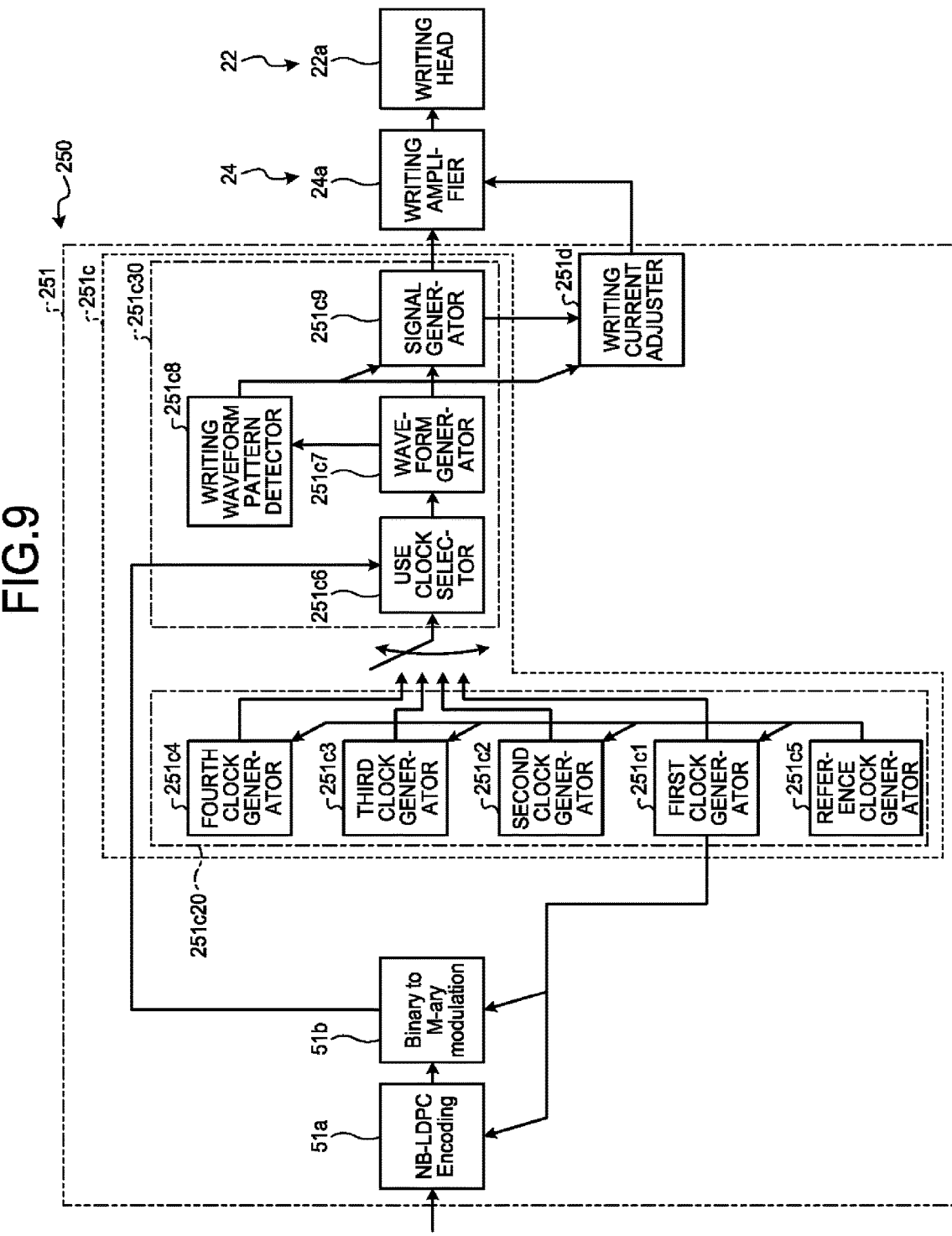

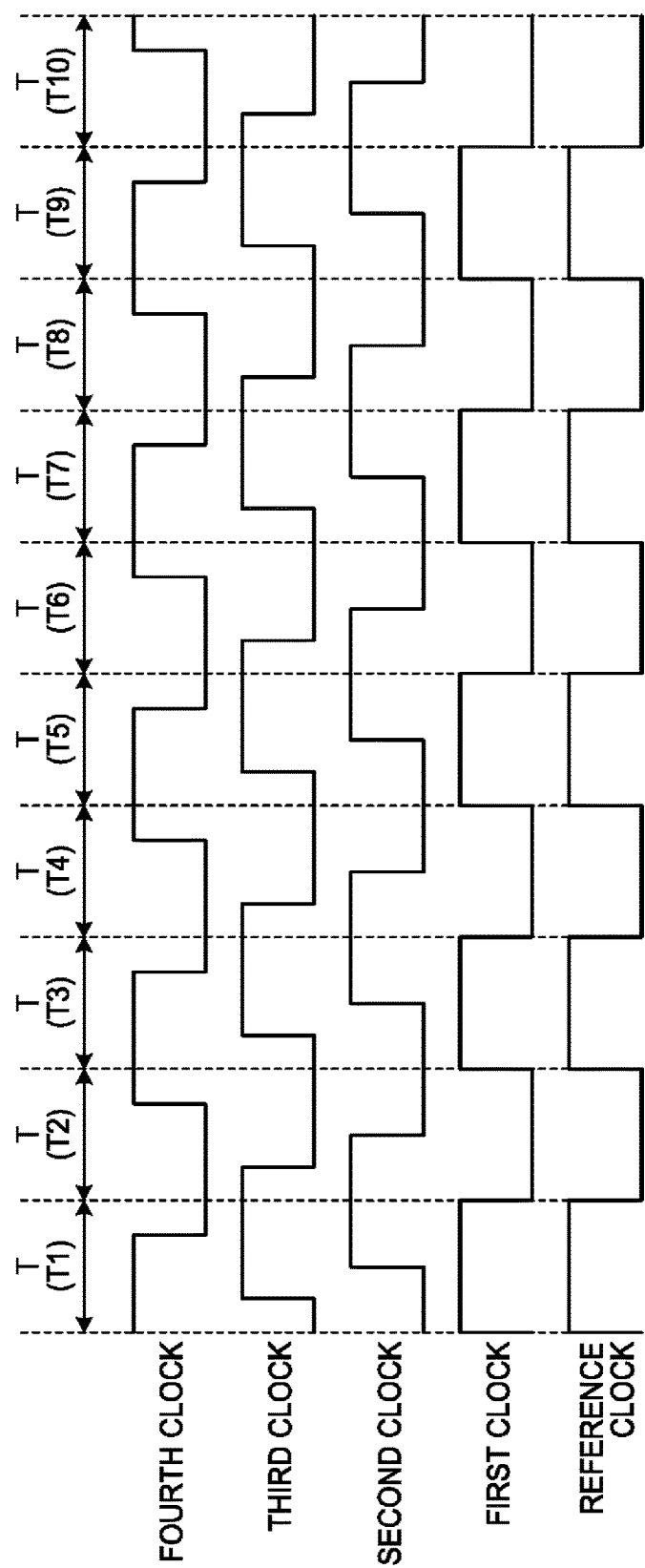

STORAGE DEVICE, CONTROLLER CIRCUIT, AND WRITING AND READING METHOD

CROSS-REFERENCE TO RELATED APPLICATIONS

This application is based upon and claims the benefit of priority front Japanese Patent Application No. 2017-003169, filed on Jan. 12, 2017; the entire content of which are incorporated herein by reference.

FIELD

Embodiments described herein relate generally to a storage device, a controller circuit, and a writing and reading method.

BACKGROUND

In the case of storage devices, such as magnetic disk devices, each track expresses the values of information bits, on the basis of magnetization directions on a storage medium. In this case, it is desired to improve the information writing density.

BRIEF DESCRIPTION OF THE DRAWINGS

FIGS. 3A to 3C are diagrams illustrating examples of conversion rules in the embodiment;

FIGS. 4A to 4D are waveform diagrams illustrating operations of the storage device in the embodiment;

FIGS. 6A to 6C are diagrams illustrating examples of conversion rules in a first modification of the embodiment;

FIGS. 7A to 7D are waveform diagrams illustrating operations of the storage device in the first modification of the embodiment;

FIG. 9 is a diagram illustrating a configuration of a controller circuit in a third modification of the embodiment;

FIG. 10 is a waveform diagram illustrating an operation of a controller circuit in a fourth modification of the embodiment.

DETAILED DESCRIPTION

Figure 1:
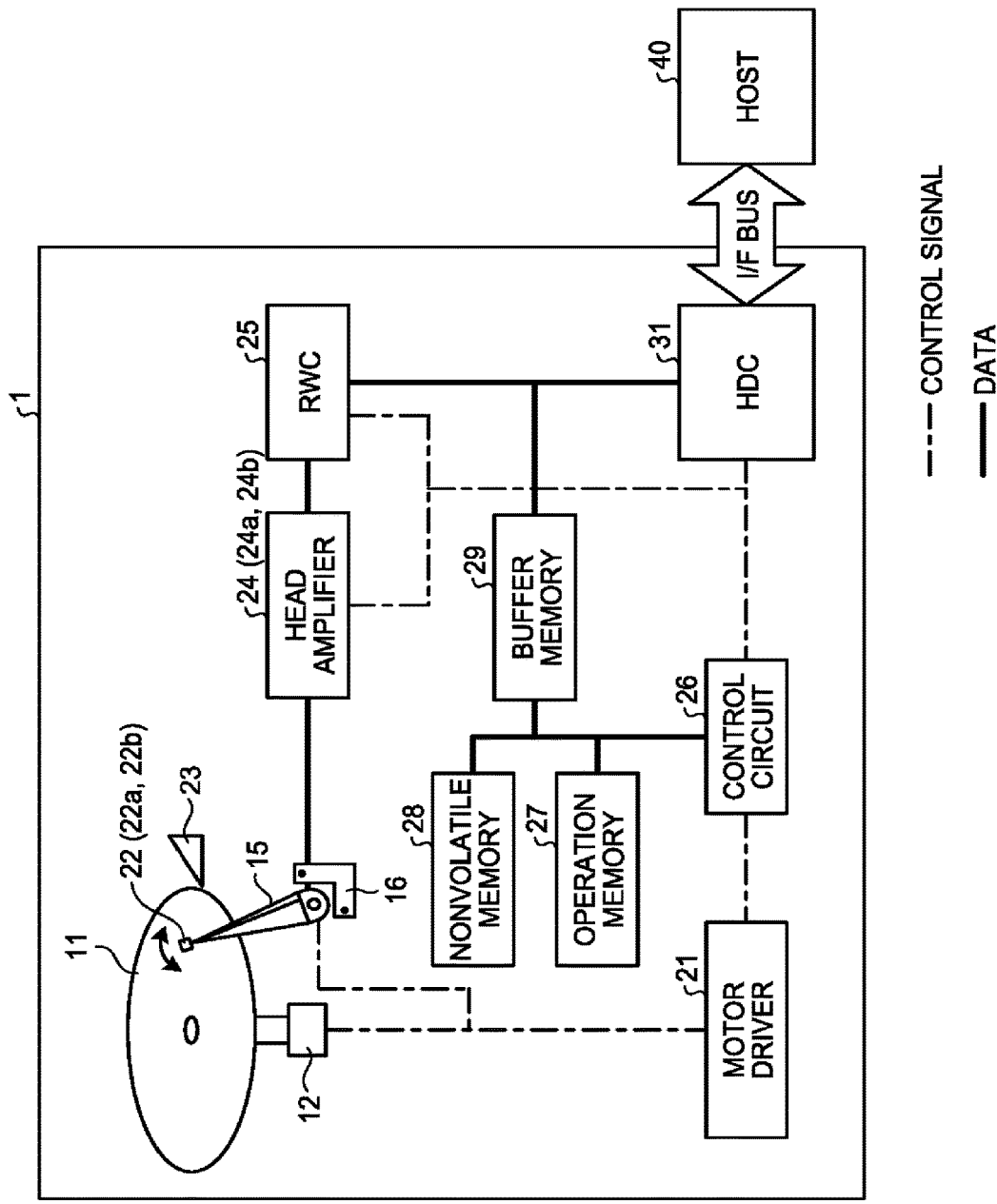
FIG. 1 is a diagram illustrating a configuration of a storage device according to an embodiment.

In general, according to one embodiment, there is provided a storage device including a controller circuit and a storage medium. The controller circuit includes a first conversion circuit and a second conversion circuit. The first conversion circuit converts data into M-ary symbols where M is an integer of 3 or more. The second conversion circuit converts respective ones of the converted n samples of M-ary symbols into signals with L-patterned pulse width where n is an integer of 2 or more and L is integer of M or more. The storage medium stores the converted n samples of signals with L-patterned pulse width. The controller circuit further includes an equalization circuit that equalizes signals read from the storage medium into the n samples of M-ary symbols.

Exemplary embodiments of a storage device will be explained below in detail with reference to the accompanying drawings. The present invention is not limited to the following embodiments.

Embodiment

An explanation will be given of a storage device 1 according to an embodiment. The storage device 1 includes a storage medium, and records information into the storage medium in accordance with a request from a host 40. For example, the storage medium encompasses a disk medium (such as a magnetic disk, optical disk, or magneto-optical disk), or a semiconductor memory. The storage device 1 is a magnetic disk device, SSD, magneto-optical disk device, or optical disk device, for example. Hereinafter, an example will be a case where the storage medium is a disk medium (magnetic disk) and the storage device 1 is a magnetic disk device. However, this embodiment is applicable also to another case.

For example, the storage device 1 records information into the storage medium 11 by a head 22, and reads signals from the storage medium 11 by the head 22. Specifically, the storage device 1 includes the storage medium 11, a spindle motor 12, a motor driver 21, the head 22, an actuator arm 15, a voice coil motor (VCM) 16, a ramp 23, a head amplifier 24, a read/write channel (RWC) 25, a hard disk controller (HDC) 31, a buffer memory 29, and a control circuit 26.

The storage medium 11 is rotated at a predetermined rotational speed about a rotational axis by the spindle motor 12. The rotation of the spindle motor 12 is driven by the motor driver 21. The storage medium 11 may be a disk medium, such as a magnetic disk or magneto-optical disk, for example. The storage medium 11 includes a perpendicular magnetic recording layer, for example. For example, on the front and rear surfaces of the storage medium 11, a plurality of servo regions are defined such that the servo regions extend in radial directions from near the center of the disk medium 11. The servo regions may be arranged at regular intervals in the circumferential direction. For example, in each servo region, servo information including servo patterns is recorded. Further, on the front and rear surfaces of the storage medium 11, a plurality of tracks are defined by servo patterns such that the tracks are concentrically present from near the center of the disk medium 11. Further, in each track, a sector area, which includes a servo region, a sync mark, and a data region, is repeatedly arranged. The sync mark indicates the head of a data region.

The head 22 performs writing and reading operation of data with respect to the storage medium 11 by a writing head 22a and a reading head 22b provided on the head 22. Further, the head 22 is present at the tip of the actuator arm 15, and is moved along the radial direction of the storage medium 11 (the track width direction) by the VCM 16 driven by the motor driver 21. When the storage medium 11 is in a state rotationally stopped or the like, the head 22 is retreated on the ramp 23.

The head amplifier 24 includes a writing amplifier 24a and a reading amplifier 24b. The reading amplifier 24b amplifies signals read from the storage medium 11 by the head 22, and outputs and supplies the signals to the RWC 25. On the other hand, the writing amplifier 24a amplifies signals for writing data into the storage medium 11, which have been supplied from the RWC 25, and supplies the signals to the head 22.

The HDC 31 performs control for transmitting and receiving data to and from the host 40 via an I/F bus, control of the buffer memory 29, and a data error correction process with respect to writing data. The buffer memory 29 is used as a cache of data to be transmitted and received to and from the host 40. Further, the buffer memory 29 is used for temporarily storing data read from the storage medium 11, data to be written to the storage medium 11, or control firmware read from the storage medium 11.

The RWC 25 performs code modulation to data to be written to the storage medium 11, which has been supplied from the HDC 31, and supplies the data to the head amplifier 24. Further, the RWC 25 performs code demodulation to signals read from the storage medium 11 and supplied from the head amplifier 24, and outputs the signals as digital data to the HDC 31.

The control circuit 26 is connected to an operation memory 27 (such as an SRAM: Static Random Access Memory), a nonvolatile memory 28 (such as a Flash ROM: Flash Read Only Memory), and a buffer memory 29 for temporary storage (such as a DRAM: Dynamic Random Access Memory). The control circuit 26 performs overall control of the storage device 1, in accordance with firmware stored in the nonvolatile memory 28 and storage medium 11 in advance. For example, the control circuit 26 is a processor, such as a CPU, and is implemented as an IC (circuit). The firmware includes initial firmware, and control firmware to be used in the normal operation. The initial firmware, which is executed first at startup, is stored in the nonvolatile memory 28, for example. The control firmware may include some of the functions of a controller circuit 50 (see FIG. 2), as described later. Further, the control firmware, which is used in the normal operation, is recorded in the storage medium 11. The control firmware is once read from the storage medium 11 to the buffer memory 29 by control according to the initial firmware, and is stored into the operation memory 27 thereafter.

The storage device 1 expresses the values of information bits, on the basis of magnetization directions on the storage medium 11. Accordingly, when the writing density on the storage medium 11 is increased, there may be a case where inter-symbol interference is caused and the reproduction signal quality is deteriorated. For example, in the case of information writing system that records binary symbols on the storage medium 11, inter-symbol interference is easily caused as the writing density is increased. Thus, it is difficult to achieve both of suppression of the reproduction signals from being deteriorated, and improvement of the information writing density.

On the other hand, a design of the storage device 1 can be considered such that two sub-tracks adjacent to each other are provided inside a track. In this case, in order to realize writing of ternary symbols by using combinations of signals having the binary amplitude values of adjacent two sub-tracks, control is performed such that a synthesis result of signals reproduced from adjacent two sub-tracks becomes a signal having a ternary amplitude value.

However, in order for a synthesis result (desired signal) of adjacent two sub-tracks to take a desired ternary amplitude value, it is required to obtain timing synchronization of writing bits between the adjacent sub-tracks forming one sector, when detecting the desired signal. However, the storage device 1 having one writing head may be difficult to realize synchronization writing between adjacent two sub-tracks. Further, even if the storage device 1 can perform the synchronization writing, the throughput performance of the writing time is likely deteriorated.

In consideration of the above, according to this embodiment, in the storage device 1, user data (bit pattern) is converted into n samples of ("n" is an integer of 2 or more) M-ary symbols ("M" is an integer of 3 or more). Respective ones of the n samples of M-ary symbols are converted into signals with L-patterned pulse width, which are then recorded into the storage medium 11. This makes it possible to realize multi-level writing to the storage medium 11, without providing a plurality of sub-tracks in each track.

Specifically, the storage device 1 has a modulation/demodulation function on writing signals, to make multi-level writing possible. The storage device 1, which deals with M-ary amplitude values with respect to reproduction signals subjected to an equalization process, performs control (pulse width modulation: PWM: Pulse Width Modulation) to the time width and phase of writing pulses having binary amplitude values. With this control, the storage device 1 records the writing pulses, which allow components of M-ary amplitude values to be extracted, into the storage medium 11 (see FIG. 4C). Further, in order to extract M-ary amplitude components at reading, the storage device 1 applies a low-pass filter having a cutoff frequency of a $1/(2N)$ bandwidth ("N" is an integer that satisfies $N=2\times(M-1)$) to the shortest magnetization reversal time of the writing pulses. This is adopted to enable detection of a desired signal (see the broken line waveform illustrated in FIG. 4D). Consequently, it is possible to substantially increase the linear writing density of user data, as compared with a case where binary writing is performed.

Figure 2:
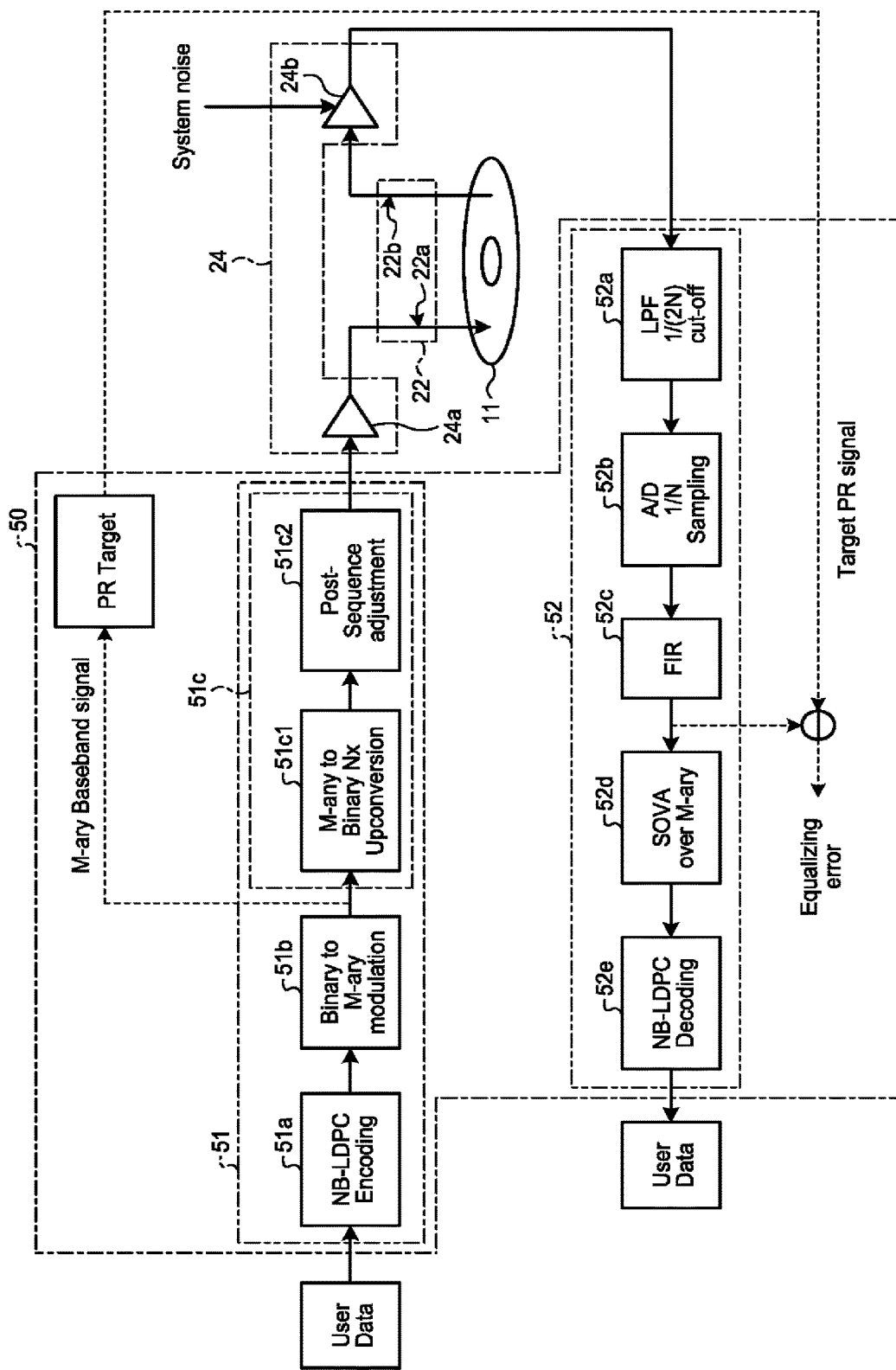
FIG. 2 is a diagram illustrating a configuration of a controller circuit in the embodiment.

For example, the magnetic writing and reading system (controller circuit 50), which has a modulation/demodulation function on writing signals to make multi-level writing possible, is configured as illustrated in FIG. 2. FIG. 2 is a diagram illustrating a configuration of the controller circuit 50. Here, each of the components in the controller circuit 50 illustrated in FIG. 2 is a functional configuration, and may be implemented in the manner of hardware (such as a system-on-chip) in the RWC 25 or the like, for example. Alternatively, each of the components in the controller circuit 50 illustrated in FIG. 2 may be implemented in the manner of software (such as a functional module that is developed by the control circuit 26 or the like into the operation memory 27 at one time or sequentially in accordance with the progress of processes) in the control circuit 26 or the like, for example. Alternatively, among the components in the controller circuit 50 illustrated in FIG. 2, each of some components may be implemented in the manner of hardware in the RWC 25 or the like, and each of the other components may be implemented in the manner of software in the control circuit 26 or the like.

The controller circuit 50 includes a data generation circuit 51 and a data recovery circuit (equalization circuit) 52. The data generation circuit 51 writes information into the storage medium 11 via the writing amplifier 24a and the writing head 22a, on the basis of user data (information bits). The data recovery circuit 52 recovers user data, on the basis of information read from the storage medium 11 via the reading head 22b and the reading amplifier 24b.

As illustrated in FIG. 2, the data generation circuit 51 includes a nonbinary LDPC encoder (NF-LDPC Encoding circuit) 51a, a first conversion circuit (Binary to M-ary modulation circuit) 51b, and a second conversion circuit 51c. The second conversion circuit 51c includes a modulation circuit (M-ary to Binary N×Upconversion circuit) 51c1 and an adjustment circuit (Post-Sequence adjustment cult) 51c2.

The nonbinary LDPC encoder 51a performs LDPC encoding to user data on GF ($2^{2n-1}$), and thereby generates codewords. Here, the GF ($2^{2n-1}$) is used as a Galois extension field. However, the Galois extension field used for LDPC encoding is not limited to this. Further, here, an LDPC code is used as an example of an error correction code for user data. However, the error correction code is not limited to this, and another code system, such as a convolution code or RS (Reed Solomon) code, may be used.

It is assumed that, when LDPC encoding is performed, n samples of symbols are used to record user data of 2n−1 bits. In this case, if the GF ($2^{2n-1}$) is used at encoding, the user data of 2n−1 bits can be treated as one element on the GF ($2^{2n-1}$).

The conversion circuit (first conversion circuit) 51b converts binary user data (binary data) into M-ary symbols (baseband signals). The first conversion circuit 51b supplies n samples of M-ary symbols (baseband signals) obtained by conversion to the conversion circuit (second conversion circuit) 51c.

For example, where n=2 and M=3, the first conversion circuit 51b converts user data of three bits into two symbols of ternary. For example, in accordance with a conversion rule determined in advance as illustrated in FIG. 3A, the first conversion circuit 51b converts the user data of three bits into two symbols of ternary. FIG. 3A is a diagram illustrating an example of a conversion rule to be used in the first conversion circuit 51b, (such as a conversion rule implemented in the form of a conversion table). In the table of FIG. 3A, the left side illustrates the values of user data three bits, and the right side illustrates the values of two symbols. For example, where user data three bits are "000", these three bits are converted into "+1 +1".

For example, as illustrated in FIG. 4A, in bit periods T1 to T12, the first conversion circuit 51b converts user data into 12 ternary symbols (baseband signals) "1, 0, −1, 0, 1, 0, 0, 0, −1, 1, 0, 1". FIG. 4A is a waveform diagram illustrating a process result (output signals) of the first conversion circuit 51b in the controller circuit 50. The first conversion circuit 51b supplies the ternary symbols obtained by conversion to the second conversion circuit 51c.

It should be noted that the conversion table of FIG. 3A is a mere example and the correlation between user data three bits and the concrete values of two symbols is not limited to the example illustrated in FIG. 3A. It is sufficient if the values of two symbols correspond to the $2^{2n-1}$ states of user data three bits one by one. Further, there are $3^2$, i.e., nine, combinations of the values of two symbols. In the conversion table, it is sufficient if eight out of the nine combinations are used. Thus, one of the combinations of the values of two symbols is not used for conversion. The error rate varies depending on which values are selected as the values of two symbols not used for conversion. Where the storage medium (magnetic disk) 11 uses a perpendicular writing system, and uses two symbols of ternary as described above, the error rate becomes higher when the values of two symbols are "0 0". Accordingly, the error rate can be reduced by creating the conversion table without including "0 0" that increases the error rate. FIG. 3A illustrates an example where the conversion table is created by excluding "0 0". As to which values end up increasing the error rate, it depends on the writing system or the like. However, once the conditions of the writing system or the like are determined, the values can be obtained in advance.

The conversion circuit (second conversion circuit) 51c receives n samples of M-ary symbols (baseband signals) from the first conversion circuit 51b. The second conversion circuit 51c performs PWM modulation to respective ones of the n samples of M-ary symbols, and thereby converts them into signals of L-patterned pulse width. At this time, the second conversion circuit 51c upconverts the signal bit rate. Thus, in the second conversion circuit 51c, the output signal frequency (bit rate) is higher than the input signal frequency (bit rate). Specifically, the second conversion circuit 51c includes the modulation circuit 51c1 and the adjustment circuit 51c2.

In accordance with the n samples of M-ary symbols, the modulation circuit 51c1 generates bit sequences (first bit sequences) with the number of bits corresponding to the L-patterned pulse width (i.e., the number of bits that can express the M-ary). The modulation circuit 51c1 performs PWM modulation to the bit sequences, while upconverting the bit rate of the n samples of M-ary symbols (baseband signals) into a bit rate corresponding to the number of bits that can express the M-ary. For example, the modulation circuit 51c1 performs PWM modulation to the bit sequences, while upconverting the bit rate of the n samples of M-ary symbols (baseband signals) into N=2×(M−1) times or more. Consequently, the modulation circuit 51c1 can change bit widths, each of which has a continuity of "1" in the bit sequence, by using L grades, in accordance with symbol values. The modulation circuit 51c1 supplies the generated bit sequences (first bit sequences) to the adjustment circuit 51c2.

For example, where M=3, the modulation circuit 51c1 receives an input of baseband signals (ternary symbols) having ternary amplitude values. In accordance with the conversion rule illustrated in FIG. 3B, the modulation circuit 51c1 converts the input ternary amplitude values (baseband signals) into binary sequences having a four-time density per symbol (first bit sequences). FIG. 3B is a diagram illustrating an example of a conversion rule to be used in the modulation circuit 51c1. In the table of FIG. 3B, the left side column illustrates the value of one symbol, and the right side column illustrates a bit sequence that has a bit rate upconverted into four times and has been subjected to PWM modulation. Here, the binary sequence having a bit rate upconverted into four times includes three types of binary patterns (0000, 0011, 1111), each of which has one block composed of four bits.

For example, as illustrated in FIG. 4B, in the bit period T1, the modulation circuit 51c1 converts a ternary symbol (baseband signal) "1" into a bit sequence (first bit sequence) "1111" with a bit rate upconverted into four times. FIG. 4B is a waveform diagram illustrating a process result (output signals) of the modulation circuit 51c1 in the controller circuit 50. In the bit period T2, the modulation circuit 51c1 converts a ternary symbol (baseband signal) "0" into a bit sequence (first bit sequence) "0011" with a bit rate upconverted into four times. In the bit period T3, the modulation circuit 51c1 converts a ternary symbol (baseband signal) "−1" into a bit sequence (first bit sequence) "0000" with a bit rate upconverted into four times. The modulation circuit 51c1 supplies the obtained bit sequences (first bit sequences) to the adjustment circuit 51c2.

The adjustment circuit 51c2 changes the bit order of each of the four-time density binary sequences (first bit sequences), and thereby generates adapted (such as optimized) bit sequences (second bit sequences). The adjustment circuit 51c2 changes the bit order in the bit sequence of each symbol, such that "1" or "0" becomes consecutive as long as possible in a plurality of symbols, and thereby generates adapted bit sequences (second bit sequences). Consequently, it is possible to easily improve the writing quality, when writing signals are recorded into the storage medium 11 in accordance with bit sequences. The adjustment circuit 51c2 supplies the generated bit sequences (second bit sequences) to the writing amplifier 24a of the head amplifier 24.

For example, where M=3, in accordance with a conversion rule illustrated in FIG. 3C, the adjustment circuit 51c2 changes the bit order of first bit sequences, and thereby generates second bit sequences. FIG. 3C is a diagram illustrating an example of a conversion rule to be used in the modulation circuit 51c1 and the adjustment circuit 51c2, (such a conversion rule implemented in the form of a conversion table). In the table of FIG. 3C, the left side column illustrates the values of three symbols, the central side illustrates bit sequences (first bit sequences) that have a bit rate upconverted into four times and have been subjected to PWM modulation, and the right side illustrates bit sequences (second bit sequences) that have been adapted with respect to a plurality of symbols by changing the bit order in the bit sequence of each symbol. The correlation between the left side column and the central side column in the table of FIG. 3C agrees to the correlation between the left side column and the right side column in the table of FIG. 3B.

The adjustment circuit 51c2 treats four bits corresponding to one symbol in a first bit sequence pattern as one block, and performs match making with a pattern in the conversion rule, in units of consecutive three blocks in time series. Upon occurrence of a pattern in the first bit sequence pattern such that it matches with the conditions of a non-adapted sequence illustrated in the central side column of the table of FIG. 3C, the adjustment circuit 51c2 converts the pattern into an adapted (such as optimized) sequence (second bit sequence) illustrated in the right side column of the table of FIG. 3C. At this time, the adjustment circuit 51c2 changes the bit orders of the input bit sequences (first bit sequences), such that the same bit value is consecutive as far as possible, as illustrated in FIG. 3C, and thereby generates adapted bit sequences (second bit sequences).

For example, as illustrated in FIG. 4C, for the bit periods T1 to T3, the adjustment circuit 51c2 converts first bit sequences "111100110000" into second bit sequences "111111000000". FIG. 4C is a waveform diagram illustrating a process result (output signals) of the adjustment circuit 51c2 in the controller circuit 50. When receiving a first bit sequence "0011" corresponding to a baseband signal "0" in the bit period 12, the adjustment circuit 51c2 may receive, from the first conversion circuit 51b, notice of that the baseband signal in the one-preceding bit period T1 is "1" and the baseband signal in the one-following bit period T3 is "−1". In accordance with the conversion rule about the symbol "0" at the center in the case of baseband signals (1, 0, −1) illustrated in FIG. 3C, the adjustment circuit 51c2 converts a first bit sequence "0011" into a second bit sequence "1100". Consequently, for the bit periods T1 to T3, the adjustment circuit 51c2 can convert the first bit sequences "111100110000" into the second bit sequences "111111000000".

The adjustment circuit 51c2 performs DA conversion to second bit sequences, which have been obtained by conversion (generation), into analog form writing signals, and supplies the writing signals to the writing amplifier 24a. The writing signals are recorded into the storage medium 11 via the writing amplifier 24a and the writing head 22a. Here, the shortest inversion section of writing signals corresponding to binary sequences converted into a four-time density, which are to be recorded into the storage medium 11, is about a half of the shortest inversion section of the original ternary writing sequences. Accordingly, it is necessary to drive the writing operation with a frequency twice the writing frequency of the original ternary writing sequences. Further, it is necessary to enable phase control with a ¼ step of the shortest inversion section of the ternary writing sequences. For example, where each period of the baseband signals illustrated in FIG. 4A is denoted by "T" (the time length of each of the bit periods T1 to T12), writing signals corresponding to the second bit sequences illustrated in FIG. 4C are controlled with a period of about T/4.

It should be noted that, as a method for achieving desired writing, for example, where M=3, there may be a method in which four-time density binary sequences are once created, and the four-time density sequences are regarded as ordinary binary writing sequences, and are recorded at a transfer rate four times the transfer rate of the original ternary amplitude sequences. In this case, the transfer rate is required to be four times as large; however, it is sufficient if the bandwidth necessary for the writing head 24a and the preceding signal amplifier is twice that of the band necessary for the original ternary writing sequences. The reason of using the four-time density resides only in that phase control with pulses of a ¼ clock width needs to be performed.

Next, an explanation will be given of a method of reading signals recorded in the storage medium 11. For reading, it is required to reproduce a waveform having ternary amplitude values supposed at writing. Signals recorded with four-time density binary sequences do not come to have ternary amplitude values if they are reproduced as they are. This is because writing sequences on the storage medium 11 are sequences obtained by conversion from ternary amplitude information into pulse width. The data recovery circuit 52 is designed to obtain a reproduction waveform with desired ternary amplitude values from a PWM waveform recorded.

As illustrated in FIG. 2, the data recovery circuit (equalization circuit) 52 includes a low-pass filter (LPF 1/2N cut-off) 52a, an AD converter (A/D 1/N Sampling) 52b, an FIR filter 52c, a soft decision unit (SOVA over M-ary) 52d, and a nonbinary LDPC decoder (NB-LDPC Decoding) 52e.

The low-pass filter 52a receives reproduction signals of a PPM waveform read from the storage medium 11 by the reading head 22b and sent via the reading amplifier 24b. The low-pass filter 52a has a cutoff frequency lower than the frequency of the second bit sequences and corresponding to the frequency of the baseband signals. The low-pass filter 52a has a cutoff frequency obtained by multiplying the frequency of the PWM waveform signals by $1/(2N)=1/[2\times\{2\times(M-1)\}]=1/[4\times(M-1)]$. With respect to the PWM waveform signals read from the storage medium 11 by the reading head 22b and sent via the reading amplifier 24b, the low-pass filter 52a performs a filtering process (high-cut process) to allow frequency components of $1/(2N)$ or less to pass therethrough selectively. Specifically, the low-pass filter 52a dulls the signals (PWM waveform signals) with a bit rate upconverted into N times relative to the baseband, and thereby substantially downconverts this bit rate into $N\times2/(2N)=1$ times. In other words, the low-pass filter 52a deals with reproduction signals read from the storage medium 11, to downconvert its bit rate into the bit rate of the baseband signals. The low-pass filter 52a supplies the processed signals to the A/D converter 52b.

For example, where M=3, the low-pass filter 52a performs a filtering process with a cutoff frequency of a 1/(2×4)=1/8 band relative to the writing signals (PWM waveform signals). Consequently, the low-pass filter 52a dulls the signals with a bit rate upconverted into four times relative to the baseband, and thereby substantially downconverts this bit rate into 4×1/(2×2)=1 times.

Specifically, as illustrated by a solid line in FIG. 4D, the low-pass filter 52a dulls the writing signals (PWM waveform signals) illustrated in FIG. 4C, and thereby generates reproduction signals with a bit rate substantially downconverted into 4×1/(2×2)=1 times. FIG. 4D is a waveform diagram illustrating a process result (output signals) of the low-pass filter 52a in the controller circuit 50.

With respect to the signals processed by the low-pass filter 52a, the A/D converter 52b performs a down-sampling process with a sampling frequency of a 1/N band relative to the writing signals (i.e., with a bit rate of N×1/N=1 times relative to the baseband). The A/D converter 52b performs the down-sampling process with a sampling frequency necessary for the original ternary amplitude sequences, with respect to the signals processed by the low-pass filter 52a. In every bit period almost equal to the baseband, the A/D converter 52b performs A/D conversion that takes sampling with timing at the center of the baseband bit period. Consequently, the A/D converter 52b downconverts the signals to turn its bit rate substantially into one time that of the baseband, and thereby reproduces a waveform with M-ary amplitude values of the baseband. Thus, it is achieved to obtain desired signals converted into a reproduction waveform having desired M-ary amplitude.

For example, where M=3, the A/D converter 52b performs a down-sampling process with a sampling frequency of a ¼ band relative to the writing signals (i.e., with the bit rate of the baseband). Specifically, in every bit period almost equal to the baseband, the A/D converter 52b performs A/D conversion with timing at the center of the baseband bit period. Consequently, it is possible to obtain desired signals converted into a reproduction waveform having desired ternary amplitude.

Specifically, with respect to the signals processed by the low-pass filter 52a, illustrated by a solid line in FIG. 4D, the A/D converter 52b performs A/D conversion with each of the timings t1 to t12 at the center of each of the bit periods T1 to T12, illustrated by a chain line in FIG. 4D. Consequently, it can be understood that reproduction signals (the signals illustrated by a broken line in FIG. 4D) are obtained with ternary amplitude similar to that of the baseband signals illustrated in FIG. 4A.

Specifically, in the reading system, regardless of the operation frequency of the writing system, if a filtering process is performed in consideration of the signal bandwidth necessary for the original M-ary (such as ternary) amplitude sequences, it is possible to obtain the PWM waveform at writing by performing demodulation without a special process. Thus, it is possible to obtain reproduction signals in a state with desired M-ary amplitude signals.

The A/D converter 52b outputs the processed signals (desired signals) to the FIR filter 52c. The FIR filter 52c performs an FIR equalization process to the desired signals (digital signals), and inputs the signals to the soft decision unit 52d. On the basis of SOVA (Soft Output Viterbi Algorithm), the soft decision unit 52d performs soft decision decoding of LDPC code to the equalized reproduction waveform, and thereby obtains the likelihood of data of 2n−1 bits (such as three bits), which corresponds to n samples of (such as two) symbols of an M-ary (such as ternary). The soft decision unit 52d can output a likelihood value with respect to every combination of bit labels, in units of a symbol that puts a plurality of bits together. For example, a soft decision result made by the soft decision unit 52d becomes a likelihood for every pattern of two symbols, such as the likelihood of "000", the likelihood of "001", ---. The soft decision unit 52d supplies the soft decision result (likelihood) to the nonbinary LDPC decoder 52e. The nonbinary LDPC decoder 52e performs an LDPC decoding process by using the likelihood.

Figure 5:
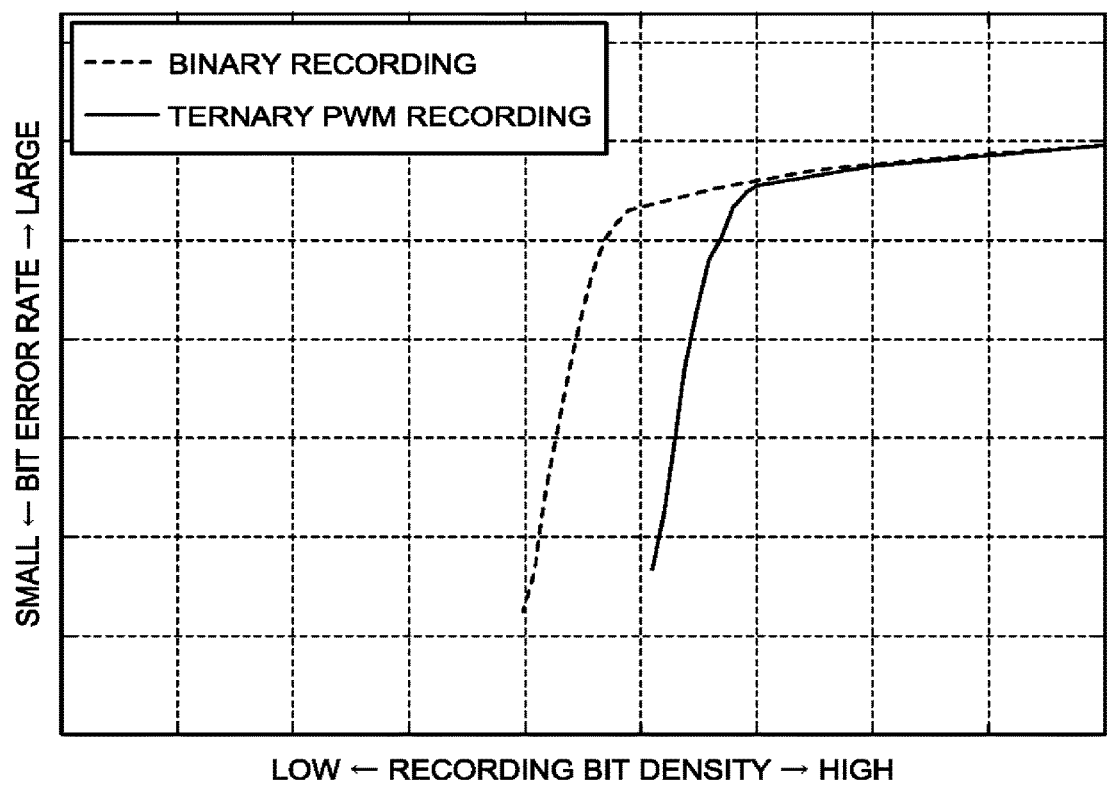
FIG. 5 is a diagram illustrating the relationship between the recording bit density and bit error rate in the embodiment.

When the respective components described above are used to perform writing and reading, a characteristic (BER: bit error rate) in the linear writing density versus the error rate is assessed, as illustrated by a solid line in FIG. 5, for example. Specifically, it can be understood that a higher writing density is achieved at the same BER, as compared with a case where binary sequences are directly used as writing sequences (the case illustrated by a broken line in FIG. 5).

As described above, according to the embodiment, in the storage device 1, user data (bit pattern) is converted into n samples of ("n" Is an integer of 2 or more) M-ary symbols ("M" is an integer of 3 or more), and respective ones of the n samples of M-ary symbols are converted into signals with L-patterned pulse width ("L" is an integer of M or more), which are then recorded into the storage medium 11. Further, signals read from the storage medium 11 are equalized into n samples of M-ary symbols, and read signals of M-ary amplitude are thereby obtained. Consequently, it is possible to achieve multi-level writing with respect to the storage medium 11, without providing a plurality of sub-tracks in each track. Thus, it is possible to increase the amount of user data to be recorded per unit area, as compared with a binary writing storage device (magnetic disk device).

First Modification

It should be noted that the storage device 1 may perform 4-ary writing as the multi-level writing. Specifically, where M=4, the first conversion circuit 51b converts user data of three bits into two symbols of 4-ary, in accordance with the conversion rule illustrated in FIG. 6A. FIG. 6A is a diagram illustrating another example of a conversion rule to be used in the first conversion circuit 51b.

In this case, for example, as illustrated in FIG. 7A, in bit periods T101 to T113, the first conversion circuit 51b converts user data into 13 4-ary symbols (baseband signals) "3, 1, −3, −1, −1, 1, −3, 3, 1, 3, 1, 1, −3". FIG. 7A is a waveform diagram illustrating a process result (output signals) of the first conversion circuit 51b in the controller circuit 50. The first conversion circuit 51b supplies the 4-ary symbols obtained by conversion to the second conversion circuit 51c.

The modulation circuit 51c1 receives an input of baseband signals (4-ary symbols) having 4-ary amplitude values. In accordance with the conversion rule illustrated in FIG. 6B, the modulation circuit 51c1 converts the input baseband signals into binary sequences having a six-time density per symbol (first bit sequences). FIG. 6B is a diagram illustrating another example of a conversion rule to be used in the modulation circuit 51c1.

For example, as illustrated in FIG. 7B, in the bit period T101, the modulation circuit 51c1 converts a 4-ary symbol (baseband signal) "3" into a bit sequence (first bit sequence) "111111" with a bit rate upconverted into six times. FIG. 7B is a waveform diagram illustrating a process result (output signals) of the modulation circuit 51c1 in the controller circuit 50. In the bit period T102, the modulation circuit 51c1 converts a 4-ary symbol (baseband signal) "1" into a bit sequence (first bit sequence) "001111" with a bit rate upconverted into six times. In the bit period T103, the modulation circuit 51c1 converts a 4-ary symbol (baseband signal) "−3" into a bit sequence (first bit sequence) "000000" with a bit rate upconverted into six times. The modulation circuit 51c1 supplies the obtained bit sequences (first bit sequences) to the adjustment circuit 51c2.

The adjustment circuit 51c2 changes the bit order of the first bit sequences, and thereby generates second bit sequences, in accordance with the conversion rule illustrated in FIG. 6C. FIG. 6C is a diagram illustrating another example of a conversion rule to be used in the modulation circuit 51c1 and the adjustment circuit 51c2.

For example, as illustrated in FIG. 7C, for the bit periods T101 to T103, the adjustment circuit 51c2 converts first bit sequences "111111001111000000" into second bit sequences "111111111100000000". FIG. 7C is a waveform diagram illustrating a process result (output signals) of the adjustment circuit 51c2 in the controller circuit 50. When receiving a first bit sequence "001111" corresponding to a baseband signal "1" in the bit period T102, the adjustment circuit 51c2 may receive, from the first conversion circuit 51b, notice of that the baseband signal in the one-preceding bit period T101 is "3" and the baseband signal in the one-following bit period T103 is "−3". In accordance with the conversion rule about the symbol "1" at the center in the case of baseband signals 1, −3) illustrated in FIG. 6C, (specifically, the conversion rule when the first bit sequences=(111111, 001111, 000000)), the adjustment circuit 51c2 converts a first bit sequence "001111" into a second bit sequence "111100". Consequently, for the bit periods T101 to T103, the adjustment circuit 51c2 can convert the first bit sequences "111111001111000000" into the second bit sequences "111111111100000000".

Further, where M=4, the low-pass filter 52a performs a filtering process with a cutoff frequency of a 2/(2×6)=1/6 band relative to the writing signals (PWM waveform signals). Consequently, the low-pass filter 52a dulls the signals with a bit rate upconverted into six times relative to the baseband, and thereby substantially downconverts this bit rate into 6×1/(2×3)=1 times.

For example, as illustrated by a solid line in FIG. 7D, the low-pass filter 52a dulls the writing signals waveform signals) illustrated in FIG. 7C, and thereby generates read signals with a bit rate substantially downconverted into 6×1/(2×3)=1 times. FIG. 7D is a waveform diagram illustrating a process result (output signals) of the low-pass filter 52a in the controller circuit 50. The low-pass filter 52a supplies the processed signals to the A/D converter 52b.

The A/D converter 52b performs a down-sampling process with a sampling frequency of a ⅙ band relative to the written signals (i.e., the baseband bit rate). Specifically, in every bit period almost equal to the baseband, the A/D converter 52b performs A/D conversion with timing at the center of the baseband bit period. Consequently, it is possible to obtain desired signals converted into a read waveform having desired 4-ary amplitude.

For example, as illustrated by a chain line in FIG. 7D, the A/D converter 52b performs A/D conversion with each of the timings t101 to t113 at the center of each of the bit periods T101 to T113, with respect to the signals processed by the low-pass filter 52a, illustrated by a solid line in FIG. 7D. Consequently, it can be understood that read signals are obtained with 4-ary amplitude similar to that of the baseband signals illustrated in FIG. 7A.

Second Modification

Figure 8:
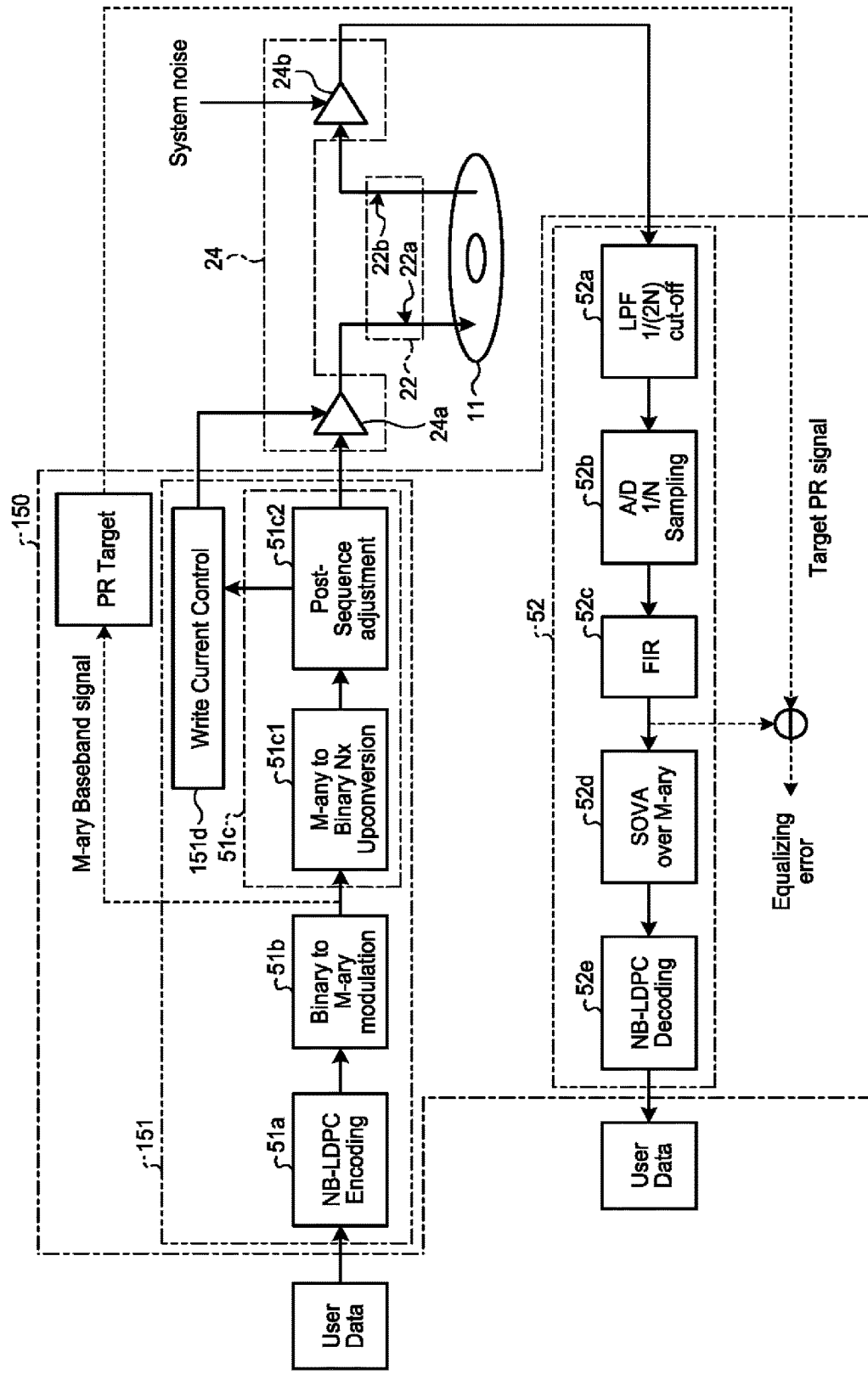
FIG. 8 is a diagram illustrating a configuration of a controller circuit in a second modification of the embodiment.

Alternatively, in consideration of the output capacity compensation of the head amplifier 24 and/or the magnetism inversion characteristic of the storage medium 11 (magnetic medium), a data generation circuit (writing process system) in a controller circuit 150 may be configured, as illustrated in FIG. 8. FIG. 8 is a diagram illustrating a configuration of the controller circuit 150 in a modification of the embodiment. Here, an explanation of configurations different from those of FIG. 2 will be given, and an explanation of the same configurations will be omitted or simplified. In order to correct a phenomenon where the magnetic inversion characteristic of the storage medium becomes non-uniform, as in the output characteristic of the pre-amplifier that is fluctuated by writing patterns, the data generation circuit 151 adjusts the writing current input from the writing amplifier 24a to the writing head 22a. For example, the data generation circuit 151 further includes a writing current control circuit (writing signal control circuit) 151d. Upon occurrence of a writing pattern (0110) or (1001) in writing second bit sequences into the storage medium 11, the adjustment circuit 51c2 gives notice of its gist to the writing current control circuit 151d, and replaces this writing pattern with (1111) or (0000). Specifically, when finding that a pattern to be output from the adjustment circuit 51c2 is (0110) or (1001), the adjustment circuit 51c2 replaces this writing pattern with (1111) or (0000). The writing current control circuit 151d controls the gain of the writing amplifier 24a such that the writing current for the writing pattern (1111) or (0000) is set weaker than the ordinary state (i.e., the level of writing signals is set lower than the ordinary level) to perform writing. Consequently, it is possible to improve the writing quality of the writing signals (signals subjected to PWM modulation).

Third Modification

Alternatively, a writing waveform output method will be further considered where ternary writing sequences are subjected to pulse width modulation and are then output. In the PWM waveform generation method illustrated in the embodiment, for example, where M=3, it is necessary to deal with binary sequences converted into a four-time density, and thus it is necessary to perform switching whose operation clock has four-time frequency components relative to the writing sequence clock. Accordingly, it is necessary to partly increase the operation clock of the writing process system. However, even on the bases of the clock of writing data currently required, a desired PWM waveform can be generated.

For example, in a data generation circuit (writing process system) 251 in a controller circuit 250 may be configured, as illustrated in FIG. 9. FIG. 9 is a diagram illustrating a configuration of the controller circuit 250 in a modification of the embodiment. In place of the data generation circuit 151 and the writing current control circuit 151d (see FIG. 8), the controller circuit 250 includes the data generation circuit 251, a conversion circuit (second conversion circuit) 251c, and a writing current adjuster 251d. The writing current adjuster (writing signal control circuit) 251d can function as in the writing current control circuit 151d in FIG. 8. On the basis of the reference clock used for baseband waveform generation, the data generation circuit 251 generates a waveform with writing signals subjected to PWM modulation as in the embodiment. The conversion circuit (second conversion circuit) 251c of the data generation circuit 251 includes a first clock generator 251c1, a second clock generator 251c2, a third clock generator 251c3, a fourth clock generator 251c4, a reference clock generator 251c5, a use clock selector 251c6, a waveform generator 251c7, a writing waveform pattern detector 251c8, and a signal generator 251c9. The first clock generator 251c1, the second clock generator 251c2, the third clock generator 251c3, the fourth clock generator 251c4, and the reference clock generator 251c5 can function as a clock generation circuit 251c5 that generates a plurality of clocks having mutually different phase shifts relative to the reference clock. The use clock selector 251c6, the waveform generator 251c7, the writing waveform pattern detector 251c8, and the signal generator 251c9 can function as a signal generation circuit 251c30 that selects one or more clocks from a plurality of clocks in accordance with the respective values of n samples of M-ary symbols obtained by conversion and generates signals of L-patterned pulse width by using the one or more clocks thus selected.

In the conversion circuit 251c, the use clock selector 251c6 receives n samples of M-ary symbols (baseband signals) from the first conversion circuit 51b. In accordance with the baseband signals, the use clock selector 251c6 performs an operation of switching clock generators for use among the first clock generator 251c1, the second clock generator 251c2, the third clock generator 251c3, and the fourth clock generator 251c4.

The first clock generator 251c1, the second clock generator 251c2, the third clock generator 251c3, and the fourth clock generator 251c4 generate a first clock, a second clock, a third clock, and a fourth clock, respectively, as illustrated in FIG. 10. FIG. 10 is a waveform diagram illustrating part of an operation of the controller circuit 250. Each of the first clock, the second clock, the third clock, and the fourth clock has a period T the same as that of the reference clock generated by the reference clock generator 251c5 (such as a period having a length equal to the length of each of the bit periods T1 to T12 illustrated in FIG. 4). The first clock generator 251c1 generates the first clock by using the reference clock received from the reference clock generator 251c5 as it is, and outputs the first clock. The second clock generator 251c2 generates the second clock by delaying the reference clock received from the reference clock generator 251c5 by a ½ period (T×1/2), and outputs the second clock. The third clock generator 251c3 generates the third clock by delaying the reference clock received from the reference clock generator 251c5 by a ¼ period (T×1/4), and outputs the third clock. The fourth clock generator 251c4 generates the fourth clock by delaying the reference clock received from the reference clock generator 251c5 by a 7/4 period (T×7/4), and outputs the fourth clock.

For example, in the bit period T1 illustrated in FIG. 4A, when the baseband signal is converted into "1", the first clock (first clock generator 251c1) that varies as illustrated in the bit period T1 of FIG. 10 is selected by the use clock selector 251c6, and is supplied as writing signal to the writing amplifier 24a via the waveform generator 251c7 and the signal generator 251c9. In the bit period T2 illustrated in FIG. 4A, when the baseband signal is converted into "0", the second clock (second clock generator 251c2) that varies as illustrated in the bit period T2 of FIG. 10 is selected by the use clock selector 251c6, and is subjected to logic inversion by the waveform generator 251c7. The signal subjected to the logic inversion is supplied as a writing signal to the writing amplifier 24a via the signal generator 251c9. In the bit period T3 illustrated in FIG. 4A, when the baseband signal is converted into "−1", the first clock (first clock generator 251c1) that varies as illustrated in the bit period T3 of FIG. 10 is selected by the use clock selector 251c6, and is subjected to logic inversion by the waveform generator 251c7. The signal subjected to the logic inversion is supplied as a writing signal to the writing amplifier 24a via the signal generator 251c9. Consequently, signals to be supplied to the writing amplifier 24a can become a waveform similar to that of the second bit sequences illustrated in FIG. 4C.

In this way, in accordance with the amplitude output of the original ternary baseband waveform, clock generators having phases necessary for an output waveform in PWM are selected, and a writing waveform output is obtained by using rectangular wave components output from the clock generators. Consequently, it is possible to obtain a PWM waveform, on the basis of the reference clock of the original ternary baseband signals, without generating a reference clock for switching four-time density binary sequences at a four-time rate as in the embodiment.

Further, for example, in the controller circuit 250 illustrated in FIG. 9, when the writing waveform pattern detector 251c8 detects a writing pattern (0110) or (1001), the writing waveform pattern detector 251c8 may supply a control signal to the signal generator 251c9 and the writing current adjuster 251d. In accordance with the control signal, the signal generator 251c9 replaces the writing pattern (0110) or (1001) with (1111) or (0000). In accordance with the control signal, the writing current adjuster (writing signal control circuit) 251d controls the gain of the writing amplifier 24a such that the writing current for the writing pattern (1111) or (0000) is set weaker than the ordinary state (i.e., the level of writing signals is set lower than the ordinary level) to perform writing. At this time, the writing waveform pattern detector 251c8, the signal generator 251c9, and the writing current adjuster 251d can operate in synchronism with the reference clock or a clock generated from the reference clock. Consequently, it is possible to improve the writing quality of the writing signals (signals subjected to PWM modulation), on the basis of the reference clock of the original ternary baseband signals.

Fourth Modification

Figure 11A:
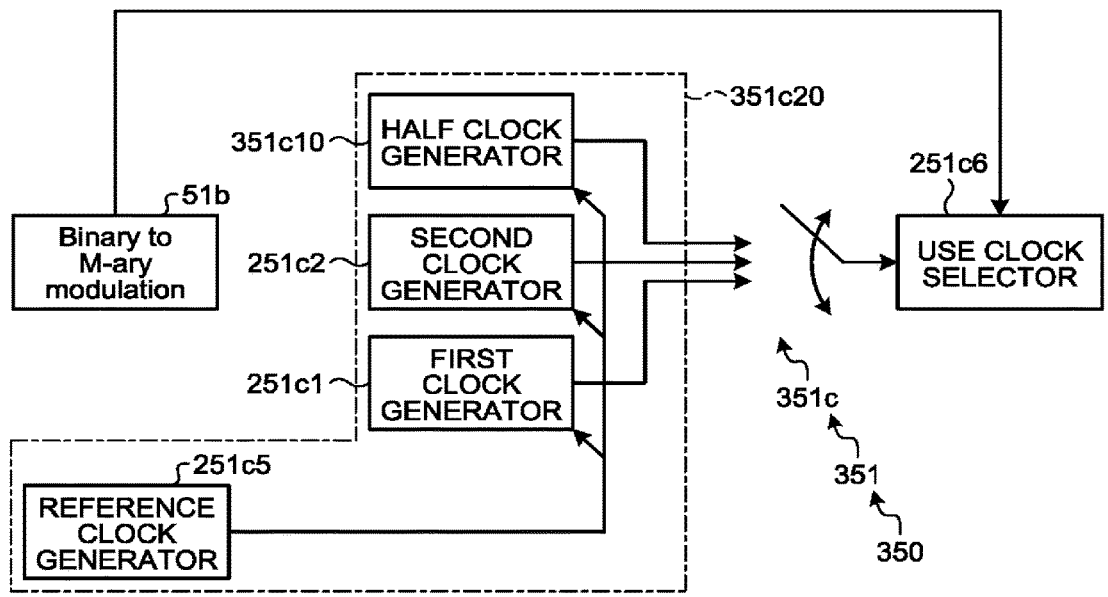
FIGS. 11A and 11B are diagrams illustrating a configuration of a controller circuit in the fourth modification of the embodiment.
Figure 11B:
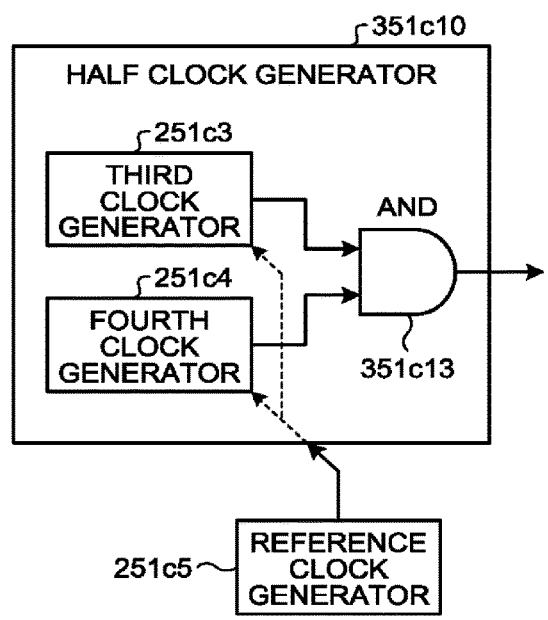

Further, in order to easily generate the shortest pulse width (T×1/2 pulse width), as illustrated in FIG. 11A, a conversion circuit (second conversion circuit) 351c of a data generation circuit 351 in a controller circuit 350 may include a half clock generator 351c10 in place of the third clock generator 251c3 and the fourth clock generator 251c4 (see FIG. 9). FIG. 11A is a diagram illustrating part of a configuration of the controller circuit 350 in a modification of the embodiment. The half clock generator 351c10, the first clock generator 251c1, the second clock generator 251c2, and the reference clock generator 251c5 can function as a clock generation circuit 35c20 that generates a plurality of clocks having mutually different phase shifts relative to the reference clock. In this case, as illustrated in FIG. 11B, the half clock generator 351c10 includes the third clock generator 251c3, the fourth clock generator 251c4, and an AND gate 351c13. The AND gate 351c13 obtains logical product (AND) of the third clock and fourth clock illustrated in FIG. 10. As obviously suggested by FIG. 10, the result of a logical product (AND) of the third clock and fourth clock can be a clock having a T×1/2 pulse width.

For example, in the bit period T11, when the baseband signal is converted into "0" as illustrated in FIG. 4A, a clock (half clock generator 351c10) with a T×1/2 pulse width obtained by the logical product (AND) of the third clock and fourth clock is selected by the use clock selector 251c6, and is subjected to logic inversion by the waveform generator 251c7. The signal subjected to the logic inversion is supplied as a writing signal to the writing amplifier 24a via the signal generator 251c9. Consequently, signals to be supplied to the writing amplifier 24a can become a waveform similar to that of the second bit sequences illustrated in FIG. 4C.

In this way, where the outputs of two clock generators having different phases are AND-synthesized, it is possible to easily obtain also a clock waveform with transition earlier than the reference clock of a ternary baseband waveform. Also in this case, all the clock components can operate by using the clock components the original ternary waveform. Thus, there is no need to use the four-time clock components as in the embodiment, to generate a writing waveform.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
a controller circuit that includes a first conversion circuit and a second conversion circuit, the first conversion circuit converting data into M-ary symbols where M is an integer of 3 or more, the second conversion circuit converting respective ones of the converted n samples of M-ary symbols into signals with L-graded pulse width where n is an integer of 2 or more and L is an integer of M or more; and
a storage medium storing the converted n samples of signals with L-graded pulse width.

2. The storage device according to claim 1, wherein
the controller circuit further includes an encoder that encodes data, and
the first conversion circuit converts data encoded by the encoder into M-ary symbols.

3. The storage device according to claim 1, wherein
the second conversion circuit includes
a modulation circuit that generates first bit sequences corresponding to a number of bits capable of expressing the L-graded pulse width, in accordance with the converted n samples of M-ary symbols, and
an adjustment circuit that generates second bit sequences by changing bit orders of the first bit sequences.

4. The storage device according to claim 1, wherein
further comprising an equalization circuit including a low-pass filter having a cutoff frequency that is lower than a frequency of signals output from the second conversion circuit and that corresponds to a frequency of M-ary symbols input to the second conversion circuit.

5. The storage device according to claim 4, wherein
the low-pass filter downconverts a frequency of signals read from the storage medium into a frequency of M-ary symbols.

6. The storage device according to claim 1, wherein
the second conversion circuit upconverts a bit rate of the converted n samples of M-ary symbols into a bit rate corresponding to the number of bits that can express the M-ary and performs PWM modulation so as to convert the respective ones of the converted n samples of M-ary symbols into signals of L-graded pulse width.

7. The storage device according to claim 1, wherein
the second conversion circuit includes
a clock generation circuit configured to generate a plurality of clocks having different phase shifts relative to a reference clock from each other, and
a signal generation circuit that selects one or more clocks from the plurality of clocks in accordance with respective values of the converted n samples of M-ary symbols, and that generates the signals with L-graded pulse width by using one or more clocks selected.

8. The storage device according to claim 7, further comprising a head configured to record information into the storage medium,
wherein the controller circuit further includes a writing signal control circuit that controls levels of the converted n samples of signals with L-graded pulse width in accordance with a pattern to be recorded by the head.

9. A controller circuit comprising:
a first conversion circuit that converts data into M-ary symbols where M is an integer of 3 or more;
a second conversion circuit that converts respective ones of the converted n samples of M-ary symbols into signals with L-graded pulse width where n is an integer of 2 or more, and that outputs the signals.

10. The controller circuit according to claim 9, further comprising an encoder that encodes data,
wherein the first conversion circuit converts data encoded by the encoder into M-ary symbols.

11. The controller circuit according to claim 9, wherein
the second conversion circuit includes
a modulation circuit that generates first bit sequences corresponding to a number of bits capable of expressing the L-graded pulse width in accordance with the converted n samples of M-ary symbols, and
an adjustment circuit that generates second bit sequences by changing bit orders of the first bit sequences.

12. The controller circuit according to claim 9, wherein
further comprising an equalization circuit including a low-pass filter having a cutoff frequency that is lower than a frequency of signals output from the second conversion circuit and that corresponds to a frequency of M-ary symbols input to the second conversion circuit.

13. The controller circuit according to claim 12, wherein
the low-pass filter downconverts the frequency of input signals into a frequency of M-ary symbols.

14. The controller circuit according to claim 9, wherein
the second conversion circuit includes
a clock generation circuit that generates a plurality of clocks having different phase shifts relative to a reference clock from each other, and
a signal generation circuit that selects one or more clocks from the plurality of clocks in accordance with respective values of the converted n samples of M-ary symbols, and that generates the signals with L-graded pulse width by using one or more clocks selected.

15. A writing and reading method comprising:
converting data into M-ary symbols where M is an integer of 3 or more;
converting respective ones of the converted n samples of M-ary symbols into signals with L-graded pulse width where n is an integer of 2 or more; and writing the converted n samples of signals with L-graded pulse width into a storage medium.

* * * * *